(12) United States Patent
Chen et al.

(10) Patent No.: US 7,273,687 B2
(45) Date of Patent: Sep. 25, 2007

(54) TONER FUSER MEMBER HAVING RELEASE LAYER FORMED FROM GLYCIDYL END-CAPPED POLYMER AND PERFLUOROALKYL GLYCIDYL-REACTIVE COMPOUND

(75) Inventors: Jiann-Hsing Chen, Fairport, NY (US); Joseph A. Pavlisko, Pittsford, NY (US); Muhammed Aslam, Rochester, NY (US); Nataly Boulatnikov, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 459 days.

(21) Appl. No.: 11/017,485

(22) Filed: Dec. 20, 2004

(65) Prior Publication Data

US 2005/0142355 A1    Jun. 30, 2005

Related U.S. Application Data

(60) Provisional application No. 60/532,418, filed on Dec. 24, 2003.

(51) Int. Cl.
G03G 13/20 (2006.01)
C08L 83/04 (2006.01)

(52) U.S. Cl. .................. 430/124; 428/413; 428/418; 428/473.5; 428/474.4; 428/480; 492/56; 399/320; 399/333; 523/435; 525/476

(58) Field of Classification Search ............... 430/124; 492/56; 399/320, 333; 523/435; 525/476; 428/413, 418, 473.5, 474.4, 480
See application file for complete search history.

(56) References Cited

U.S. PATENT DOCUMENTS

| | | | |
|---|---|---|---|
| 5,529,847 A | 6/1996 | Chen et al. | 428/413 |
| 5,778,295 A | 7/1998 | Chen et al. | 399/329 |
| 5,853,892 A | 12/1998 | Chen et al. | 428/421 |
| 5,948,491 A | 9/1999 | Chen et al. | 428/35.7 |
| 6,074,574 A | 6/2000 | Chen et al. | 252/183.11 |

Primary Examiner—Mark A. Chapman
(74) Attorney, Agent, or Firm—Lawrence P. Kessler

(57) ABSTRACT

A toner fuser member has a substrate, on which is formed a toner release surface layer from a composition that includes: about 95 wt. % to about 99.9 wt. % of a cross-linked, glycidyl end-capped bisphenolic polymer having the formula

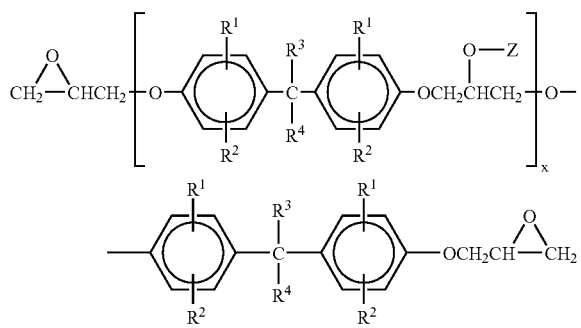

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10; and about 0.01 wt. % to about 5 wt. % of a perfluoroalkylsubstituted glycidyl-reactive compound having the formula

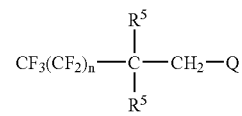

where $R^5$ is H or F, Q is OH or $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15. When Q is $SiR^6R^7R^8$, at least one of $R^6$, $R^7$, and $R^8$ is Cl, OH, or an alkoxy, acyloxy, or amino group.

19 Claims, No Drawings

TONER FUSER MEMBER HAVING RELEASE LAYER FORMED FROM GLYCIDYL END-CAPPED POLYMER AND PERFLUOROALKYL GLYCIDYL-REACTIVE COMPOUND

CROSS REFERENCE TO RELATED APPLICATION

Reference is made to and priority claimed from U.S. Provisional Application Ser. No. 60/532,418, filed Dec. 24, 2003, entitled TONER FUSER MEMBER HAVING RELEASE LAYER FORMED FROM GLYCIDYL END-CAPPED POLYMER AND PERFLUOROALKYL GLYCIDYL-REACTIVE COMPOUND.

FIELD OF THE INVENTION

This invention relates in general to electrostatographic imaging and, in particular, to toner fuser members. More particularly, this invention relates to a fuser member having a toner release surface layer formed from a composition containing a glycidyl end-capped polymer and a perfluoroalkylsubstituted glycidyl-reactive compound.

BACKGROUND OF THE INVENTION

In electrostatographic imaging and recording processes such as electrophotographic copying, an electrostatic latent image formed on a photoconductive surface is developed with a thermoplastic toner powder, which is thereafter fused to a receiver. The fuser member can be a roll, belt, or any surface having the suitable shape for fixing thermoplastic toner powder to the receiver. The fusing step commonly includes passing the receiver, for example, a sheet of paper on which toner powder is distributed in an image-wise pattern, through the nip of a pair of rolls. At least one of the rolls is heated; in the case where the fuser member is a heated roll, a smooth resilient surface is bonded either directly or indirectly to the core of the roll. Where the fuser member is in the form of a belt, it is preferably a flexible endless belt having a smooth, hardened outer surface that passes around the heated roller. A persistent problem with electrostatographic fusing systems, known as offset, is the adhesion of heat-softened toner particles to the surface of the fuser member rather than the receiver during passage through the rolls. Any toner remaining adhered to the fuser member can cause a false offset image to appear on the next sheet that passes through the rolls and can also degrade the fusing performance of the member. Another possible problem is degradation of the member surface caused by continued heating, which results in an uneven surface and defective patterns in thermally fixed images.

Toner fuser rolls are composed of a cylindrical core that may include a heat source in its interior, and a resilient covering layer formed directly or indirectly on the surface of the core. Roll covering layers are commonly made of fluorocarbon polymers such as TEFLON™ or silicone polymers such as poly(dimethylsiloxane) polymers. A thin layer of a suitable primer may be advantageously coated on the surface of the core to improve its bonding of with the covering layer. For example, U.S. Pat. No. 5,948,491 discloses a priming agent composition that is useful for binding a toner fuser member surface layer containing a fluorocarbon polymeric material to a metallic or an organic polymeric substrate. An intervening layer of the described priming agent composition, which comprises about 98 to 99.99 wt. % of a cross-linked glycidyl end-capped bisphenolic polymer and about 0.01 to 2 wt. % of a perfluoroalkylsubstituted glycidyl-reactive compound, improves the adherence of a surface layer formed from an amorphous fluoroplastic material such as TEFLON™ to the fuser member substrate.

Frequently, release oils composed of, for example, poly (dimethylsiloxanes) are applied to the fuser roll surface to prevent adherence of toner to the roll. Such release oils may interact with the resilient layer upon repeated use and in time cause swelling, softening, and degradation of the roll. Silicone rubber covering layers that are insufficiently resistant to release oils and cleaning solvents are also susceptible to delamination of the roll cover after repeated heating and cooling cycles.

Toner fuser belts are composed of a continuous flexible material having superior resistance to heat and a smooth surface. The belt substrate can be metallic or polymeric. As described above for fuser rolls, the surface layer of the belt is typically a thin coating of a low surface energy polymer such as a fluorocarbon or a silicone resin. This outer layer should adhere strongly to the belt substrate and form a hard, tough surface that is resistant to wear and cracking as well as to cleaning solvents and fluids.

In electrostatographic imaging processes dry developers can be used to form an image on a receiving surface such as a sheet of paper. Dry developers usually include a toner powder and carrier particles. Carrier particles and toner particles have different triboelectric values. As the developer mixture is agitated, the particles rub together and the toner and carrier particles acquire opposite electric charges and cling together. In the subsequent development step the somewhat higher opposite charge of the electrostatic latent image draws the colored toner from the carrier and develops the image. Various addenda are frequently used to improve the properties of the toner and carrier particles.

Toners include, as a major component, the binder and, as minor components, a colorant, and a charge control agent. The binder can be any resin having properties suitable for dry toners. Many such resins are known, but thermoplastic resins that are fixable by fusing are especially useful. When a dry toner powder image is transferred from one surface to another, defects in the image can occur. It is known from U.S. Pat. No. 4,758,491 that the addition of low surface energy liquid or solid addenda, especially polymers containing organopolysiloxane segments, may alleviate many of these defects.

Carrier particles include magnetizable irregular particles that are usually coated with a film of a polymeric material, which helps develop the triboelectric charge and aids the transfer of the toner. The coating material must adhere well to the carrier particle because the toner charge decreases as the polymer wears off. Polymers with low surface energy properties are especially useful for coating carrier particles.

Recent electrophotographic apparatus and processes are disclosed in U.S. Pat. Nos. 5,089,363 and 5,411,779, the disclosures of which are incorporated herein by reference.

U.S. Pat. No. 5,411,779 describes an apparatus having an image-fixing belt with a polyimide resin inner layer and a fluoroplastic outer layer that produces unglossed, matte images. Other fuser belt systems are described in U.S. Pat. Nos. 5,200,284; 5,233,008; 5,330,840; 5,362,833; and 5,529,847, the disclosures of which are incorporated herein by reference.

The ferrotyping belt used for the production of high gloss toner images typically has a metal or an organic polymeric substrate on which is coated a release layer. The toner is generally fused in a heated nip to a receiver, which then continues to travel along the belt without releasing until the toner is cool. To avoid the use of a release oil, the release layer of the fuser belt must have low surface energy.

Toner fuser belts are composed of a continuous smooth, heat-resistant, flexible material on a metallic or polymeric substrate. A release layer applied to the belt substrate is a thinly coated, low surface energy polymer such as a fluorocarbon or a cross-linked silicone resin. Such release layers, however, often display poor mechanical properties, including inadequate adhesion to the metal support, and are susceptible to rapid wear upon repeated contact with abrasive receiving sheets such as bond paper or uncoated laser print paper.

There remains an ongoing need for fuser belts having durable surface layer compositions that adhere well to the substrate, form a hard, tough surface that is resistant to wear, cracking and solvents, and are capable of producing multiple high quality, high gloss toner images, including multicolor images. This need is well met by the release layer composition of the present invention.

SUMMARY OF THE INVENTION

The present invention is directed to a toner fuser member having a substrate on which is disposed a toner release surface layer formed from a composition including:

about 95 wt. % to about 99.9 wt. % of a cross-linked, glycidyl end-capped bisphenolic polymer having the formula

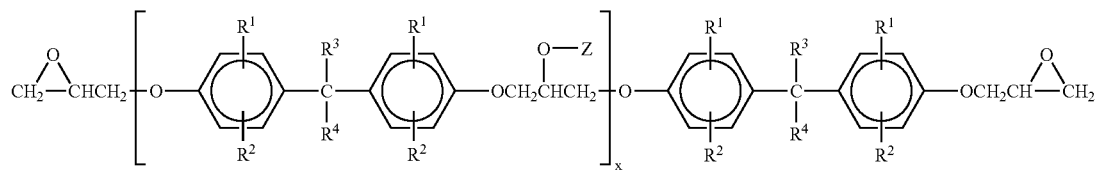

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10;

and about 0.01 wt. % to about 5 wt. % of a perfluoroalkylsubstituted glycidyl-reactive compound having the formula

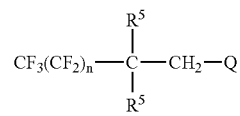

where $R^5$ is H or F, Q is OH or $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, when Q is $SiR^6R^7R^8$, at least one of $R^6$, $R^7$, and $R^8$ is Cl, OH, or an alkoxy, acyloxy, or amino group.

DETAILED DESCRIPTION OF THE INVENTION

In accordance with the present invention, a toner fuser member, preferably a fuser belt having a toner release surface layer coated on a metallic or an organic polymeric substrate provides high gloss, durability, and good release of toner images without the need for a release agent such as an oil.

The fuser belt of the present invention, whose substrate preferably includes a polyimide resin, can be employed in a fusing apparatus such as that described in U.S. Pat. No. 5,778,295, the disclosure of which is incorporated herein by reference. The surface release layer of the belt, which is characterized by a low coefficient of friction and by good adhesion to the substrate in the absence of an intervening primer layer, produces fused toner images, including multicolor images that are characterized by excellent clarity and high gloss.

The priming agent composition that is used in an underlying layer beneath a surface layer, as described in the above-discussed U.S. Pat. No. 5,948,491, is similar to that employed in the formation of the surface release layer of the present invention. However the cross-linked surface layer of the present invention exhibits a high resistance to wear and abrasion that is superior to that of the amorphous fluoroplastic surface layer disclosed in U.S. Pat. No. 5,948,491.

In the toner release surface layer composition of the present invention, the crosslinked, glycidyl end-capped polymer is a cross-linked bisphenolic polymer of the formula

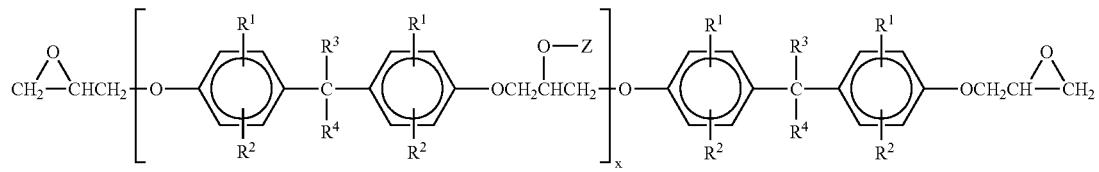

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10.

The bisphenolic epoxy resin is cross-linked by a difunctional dicarbonylsubstituted crosslinking agent, preferably a dianhydride such as pyromellitic anhydride or a diimide. The weight ratio of epoxy resin: cross-linking agent is preferably about 2:1 to about 5:1, more preferably about 3.3:1.

The toner release surface layer composition of the present invention may further include a filler, such as $SiO_2$, $TiO_2$, ZnO, $SnO_2$, or $Al_2O_3$, or mixtures thereof, in an amount ranging from about 1 wt. % to about 30 wt. %. Preferably, the filler is $SiO_2$, in an amount from about 1 wt. % to about 7 wt. %.

Bisphenol epoxy resins useful in the present invention are commercially available and include, for example, HYSOL™ EA 9369 QT, a crosslinked Bisphenol F epoxy resin, available from Dexter Aerospace, and STYCAST™ W-66 black resin and crosslinking Catalyst 17, a two-component formulation from Emerson & Cuming, Inc., Lexington, Mass.

The release layer coating composition of the invention includes about 0.01 wt. % to about 5 wt. %, preferably about 0.1 wt. % to about 3 wt. %, of a perfluoroalkylsubstituted glycidyl-reactive compound represented by the formula

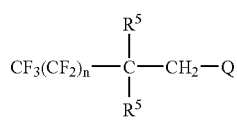

where $R^5$ is H or F, Q is OH, or $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, when Q is $SiR^6R^7R^8$, at least one of $R^6$, $R^7$, and $R^8$ is Cl, OH, or an alkoxy, acyloxy, or amino group. Preferably, at least one of $R^6$, $R^7$, and $R^8$ is Cl or alkoxy. In more preferred compounds, $R^6$ and $R^7$ are each Cl, or $R^6$, $R^7$, and $R^8$ are each methoxy or ethoxy.

The perfluoroalkylsubstituted glycidyl-reactive compound in the release layer composition preferably contains about 7 to 21 fluorine atoms. Suitable compounds include 1,1,2,2-tetrahydro-tridecafluorooctyl-1-methyldichlorosilane, $CF_3(CF_2)_5CH_2CH_2Si(CH_3)Cl_2$, available from United Chemical, and 1,1,2,2-tetrahydro-heptadecafluorodecyl-1-triethoxysilane, $CF_3(CF_2)_7CH_2CH_2Si(OC_2H_5)_3$, available from PCR Inc., Gainesville, Fla. Other preferred compounds include 1,1,2,2-tetrahydro-heptadecafluoro-1-decanol, $CF_3(CF_2)_7CH_2CH_2OH$, and 1,1-dihydro-nonadecafluoro-1-decanol, $CF_3(CF_2)_8CH_2OH$, both available from PCR Inc., Gainesville, Fla.

The toner fuser member of the present invention, preferably a fuser belt, includes a substrate is formed of a metal or an organic polymeric material. Suitable metals include, for example, steel, stainless steel, aluminum, copper, and nickel. Organic polymers suitable as toner belt substrates include, for example, thermoset polyamide-imides, polycarbonates, polyesters, and, preferably, polyimides.

The following examples serve to illustrate the invention:

EXAMPLE 1

Preparation of Release Layer Compositions
The following solutions were prepared:
A. 100 g of STYCAST™ W-66 epoxy resin (from Emerson & Cuming, Inc., Lexington, Mass.) in 100 g of tetrahydrofuran (THF)
B. 30 g of cross-linking Catalyst 17 (from Emerson & Cuming, Inc., Lexington, Mass.) in 170 g of tetrahydrofuran (THF)
C. 1.5 gm of the glycidyl-reactive compound $CF_3(CF_2)_8CH_2OH$ (PCR 171132, from PCR Inc., Gainesville, Fla.) in 18.7 gm of tetrahydrofuran (THF).

These solutions were employed to coat fuser belts as described in Examples 2 and 3 following:

EXAMPLE 2

Preparation of Toner Fuser Belt Control
A seamless endless polyimide belt (from Gunze Limited, Osaka, Japan) having a length (circumference) of 60.3 cm and width of 38 cm was wiped clean, first with alcohol and then with methyl ethyl ketone, using a lint-free cloth. The cleaned belt was then ring coated with 120 g of a mixture containing 60 g each of solutions A and B from Example 1. The coated belt was ramp heated from room temperature to 150° C. over a period of 4 hr, held at 150° C. for 2 hr longer, and cooled to give the Control fuser belt.

EXAMPLE 3

Preparation of Toner Fuser Belt Examples
A cleaned polyimide belt was ring coated with a mixture containing 28 g of solution A, 42 g of solution B, and 0.81 g of solution C. The coated belt was heated and cooled as described in Example 2 to give fuser belt 1, containing 0.30 wt. % glycidyl-reactive compound. In similar fashion, cleaned polyimide belts were ring coated with:

a mixture containing 28 g of solution A, 42 g of solution B, and 1.87 g of solution C to give fuser belt 2, containing 0.68 wt. % glycidyl-reactive compound;

a mixture containing 28 g of solution A, 42 g of solution B, and 3.75 g of solution C to give fuser belt 3, containing 1.4 wt. % glycidyl-reactive compound; and a mixture containing 28 g of solution A, 42 g of solution B, and 5.625 g of solution C to give fuser belt 4, containing 2.1 wt. % glycidyl-reactive compound.

The belts prepared in Examples 2 and 3 are listed in TABLE 1 following:

TABLE 1

| Fuser Belt | Wt. % Glycidyl-Reactive Compound | Belt G60 Gloss | Wear Cycles |
|---|---|---|---|
| Control | 0 | 26.7 | 300 |
| 1 | 0.30 | 40.4 | 620 |
| 2 | 0.68 | 49.5 | 1160 |
| 3 | 1.4 | 50.5 | 2570 |
| 4 | 2.1 | 60.2 | 3180 |

EXAMPLE 4

Measurement of Gloss of Fuser Belts

The Gardner gloss value is essentially a ratio determined by measuring the amount of light reflected off a fuser belt surface at a specific angle measured from a line perpendicular to the belt surface, and dividing the foregoing by the amount of light introduced to the surface at the same angle on the opposite side of the perpendicular line. The angles off the perpendicular line at which the gloss measurements are commonly taken are 20°, 60°, and 85° using a Gardner MICRO-TRI-GLOSS 20-60-85 Glossmeter, available from BYK Gardner USA of Rivers Park Md. The gloss value as measured by the Gardner Glossmeter is often reported as a G next to a number representing the size of the specific angle used in measuring gloss, for example, G20, G60, and G85.

Gloss measurements were made on the Control belt and on Belts 1, 2, 3, and 4 of the invention. Gardner gloss levels measured at an angle of 60° are presented as G60 gloss values in TABLE 1 for each of the fuser belts.

As shown by the G60 gloss measurement data included in TABLE 1, the inclusion of the perfluoroalkylsubstituted glycidyl-reactive compound in the release layer coating composition results in fuser belt surfaces having desirably high gloss values that increase with increasing amounts of added glycidyl-reactive compound. It should be noted that the measured gloss values of fused toner images obtained using these belts are substantially the same as the fuser belt surface gloss values.

EXAMPLE 5

Wear Tests of Fuser Belts

The wear rates of the Control belt and of Belts 1, 2, 3, and 4 were using a Norman Abrasion Wear Tester (Norman Tool Inc., Evansville, Ind.). Samples coated on a polyimide belt substrate and having a thickness of about 5 μm, a width of 9/16", and a length of 2" were employed for the wear tests, which were carried out at 350° F. The wear cycles were accumulated until the coating had worn through to the substrate. The results, reported as wear cycles, are also included in TABLE 1.

As shown by the wear data in TABLE 1, the inclusion of a very small amount of the glycidyl-reactive compound in the coating composition, as in belt 1, leads to a substantial improvement in the durability of the release layer. Increasing amounts of this compound result in correspondingly increasing durability. Belt 4, whose surface layer contains 2.1 wt. % of glycidyl-reactive compound, showed a more than ten-fold increase in durability relative to the Control belt.

The invention has been described in detail with particular reference to certain preferred embodiments thereof, but it is understood that variations and modifications can be effected within the spirit and scope of the invention, which is defined by the claims that follow.

What is claimed is:

1. A toner fuser member comprising:
a substrate;
a toner release surface layer disposed on said substrate, said surface layer being formed from a composition that comprises:
about 95 wt. % to about 99.9 wt. % of a cross-linked, glycidyl end-capped bisphenolic polymer having the formula

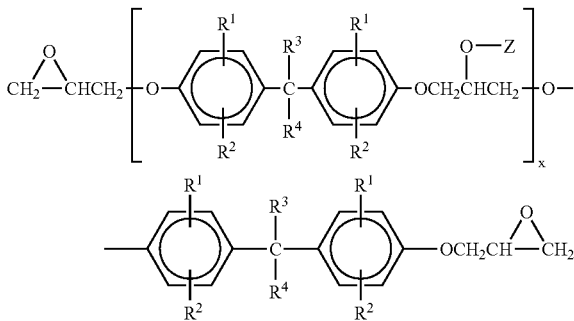

where $R^1$ and $R^2$ are each independently H or an alkyl group containing 1 to about 4 carbon atoms, and $R^3$ and $R^4$ are each independently H, F, or an alkyl group containing 1 to about 4 carbon atoms, Z is a carbonyl cross-linking group, and x is an integer from 1 to about 10; and
about 0.01 wt. % to about 5 wt. % of a perfluoroalkyl-substituted glycidyl-reactive compound having the formula

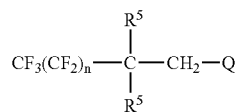

where $R^5$ is H or F, Q is OH or $SiR^6R^7R^8$, $R^6$, $R^7$, and $R^8$ being independently selected from the group consisting of Cl, OH, an alkyl group containing 1 to about 4 carbon atoms, an alkoxy group containing 1 to about 4 carbon atoms, an acyloxy group containing 2 to about 4 carbon atoms, and an amino group containing 0 to about 4 carbon atoms; and n is an integer from 1 to about 15; with the proviso that, when Q is $SiR^6R^7R^8$, at least one of $R^6$, $R^7$, and $R^8$ is Cl, OH, or an alkoxy, acyloxy, or amino group.

2. The toner fuser member of claim 1 wherein said composition comprises about 0.1 wt. % to about 3 wt. % of said perfluoroalkylsubstituted glycidyl-reactive compound.

3. The toner fuser member of claim 1 wherein said glycidyl end-capped bisphenolic polymer is cross-linked by a cross-linking agent that comprises a diimide or a dianhydride.

4. The toner fuser member of claim 3 wherein said cross-linking agent comprises pyromellitic anhydride.

5. The toner fuser member of claim 3 wherein said composition comprises said glycidyl end-capped bisphenolic polymer and said cross-linking agent in a weight ratio of about 2:1 to about 5:1.

6. The toner fuser member of claim 5 wherein said toner composition comprises said glycidyl end-capped bisphenolic polymer and said cross-linking agent in a weight ratio of about 3.3:1.

7. The toner fuser member of claim 1 wherein said composition further comprises a filler selected from the group consisting of $SiO_2$, $TiO_2$, ZnO, $SnO_2$, $Al_2O_3$, and mixtures thereof.

8. The toner fuser member of claim 7 wherein said composition comprises said filler in an amount of about 1 wt. % to about 30 wt. %.

9. The toner fuser member of claim 8 wherein said composition is $SiO_2$ in an amount of about 1 wt. % to about 7 wt. %.

10. The toner fuser member of claim 1 wherein $R^1$, $R^3$, and $R^4$ are each H.

11. The toner fuser member of claim 1 wherein Q is OH and n is 7 or 8.

12. The toner fuser member of claim 1 wherein said member is a fuser belt.

13. The toner fuser member of claim 12 wherein said fuser belt comprises a substrate formed of metal.

14. The toner fuser member of claim 13 wherein said metal is selected from the group consisting of steel, stainless steel, aluminum, copper, and nickel.

15. The toner fuser member of claim 12 wherein said fuser belt comprises a substrate formed of a thermoset organic polymeric material.

16. The toner fuser member of claim 15 wherein said thermoset organic polymeric material is selected from the group consisting of a polyimide, a polyamide, a polyamide-imide, a polycarbonate, and a polyester.

17. The fuser member of claim 16 wherein said thermoset organic polymeric material comprises a polyimide.

18. The toner fuser member of claim 1 wherein said surface layer has a thickness of about 1 μm to about 20 μm.

19. The toner fuser member of claim 18 wherein said thickness is about 5 μm to about 10 μm.

* * * * *